US005467864A

United States Patent [19]

McCoy et al.

[11] Patent Number: 5,467,864

[45] Date of Patent: Nov. 21, 1995

[54] DUAL PURPOSE APPARATUS TO MANIPULATE WORKPIECES

[75] Inventors: Gary W. McCoy, Mars; John M. Zwigart, New Brighton; Mark R. Tweedy, Valencia, all of Pa.

[73] Assignee: Carl Strutz & Co., Inc., Mars, Pa.

[21] Appl. No.: 285,331

[22] Filed: Aug. 1, 1994

Related U.S. Application Data

[63] Continuation-in-part of Ser. No. 882,939, May 14, 1992, Pat. No. 5,333,720.

[51] Int. Cl.$^{6}$ ...................................................... B65G 47/24

[52] U.S. Cl. ....................... 198/409; 198/374; 198/468.2; 414/226; 101/40

[58] Field of Search .................................... 198/374, 409, 198/468.2; 414/225, 226; 101/37, 40, 40.1

[56] References Cited

U.S. PATENT DOCUMENTS

| | | | |
|---|---|---|---|
| 2,231,535 | 2/1941 | Jackson et al. . | |
| 2,261,255 | 11/1941 | Jackson . | |
| 2,721,516 | 10/1955 | Campbell et al. . | |
| 3,146,705 | 9/1964 | Ritzerfeld et al. . | |
| 3,159,100 | 12/1964 | Marguiss | 198/468.2 |
| 4,176,598 | 12/1979 | Dubuit | 101/40.1 |
| 4,343,391 | 8/1982 | Shrypek et al. | 101/40 |
| 4,463,371 | 7/1984 | Lewis . | |
| 4,491,214 | 1/1985 | Malivoir et al. | 198/374 |
| 4,822,233 | 4/1989 | Hansel | 414/225 |
| 5,249,663 | 10/1993 | McCoy et al. | 198/468.2 |
| 5,333,720 | 8/1994 | Zwigart et al. | 198/409 |

*Primary Examiner*—Joseph E. Valenza
*Attorney, Agent, or Firm*—Clifford A. Poff

[57] ABSTRACT

Workpieces are manipulated between the receiving position and the discharge position by supporting gripper arms on a platform mounted on a pivot shaft. The pivot shaft pivots between a position where a workpiece is gripped by gripper arms to a pivotal discharge position where the workpiece is released by the gripper arms. The pivot shaft is moved horizontally by a threaded adjusting screw toward and away from a vacuum chuck in a silk-screen printing machine to compensate for changes to the length of the workpiece to be carried by the vacuum chuck. This allows conveyors to remain at fixed elevations and merely change the site at which the workpieces are picked up in the case of a loading mechanism from a feed conveyor and the site where workpieces are deposited on a conveyor for an unloading operation. The pivot shaft carries pivot arms that in turn pivotally support swing arms that can be selective locked to prevent pivotal movement between the pivot arms and unlocked so that as the pivot arms pivots the swing arms rotate relative to the pivot arms.

14 Claims, 14 Drawing Sheets

DUAL PURPOSE APPARATUS TO MANIPULATE WORKPIECES

This application is a continuations-in-part of application Ser. No. 882,939 Filed May 14, 1992 now U.S. Pat. No. 5,333,720.

BACKGROUND OF THE INVENTION

1. Field of the Invention

This invention relates to manipulating workpieces from one orientation to a second orientation between diverse conveyances devices. More particularly, the present invention relates to providing an apparatus to selectively orientate workpieces while undergoing manipulation to enable support of the workpiece by the same or different surfaces before and after manipulation.

2. Description of the Prior Art

As shown in U.S. Pat. Nos. 2,231,535; 2,261,255; 2,721, 516; and 3,146,705 intermittent motion type decorating machines are known in the art and provide a drive system to impart intermittent traveling motion to the workpieces such as containers made of glass or plastic. A container is moved through a predetermined distance, stopped, moved again through a predetermined distance, stopped and again moved until each container through the sequence of motions moves completely through the decorating stations of the machine. A decorating station will be provided at each place where the container comes to a stop. At the decorating station, a decorating screen is displaced into line contact with the surface of the container by as associate squeegee and then the container is rotated and the squeegee remains stationary for a decorating process. It is advantageous for this decorating process to provide that the container surface which is to receive the decoration is horizontally oriented. This is because the printing medium is subject to the influence of gravity whereby the printing medium can be uniformly spread across the screen surface when the squeegee spreads the printing medium horizontally. When the ink spreading surface of the squeegee is oriented vertically, it is difficult to maintain an adequate supply of ink throughout the height of the printing screen. The advantages of decorating the workpiece while the workpiece is orientated horizontally is equally applicable to other examples of workpieces such as glass tumblers where, for example, it is possible to grip the workpiece at one end only. With respect to a soda bottle, for example, the bottle mouth site usually regarded as too small of an area to sustain the weight of the bottle by a vacuum chuck. Alternative support systems can be used such as engaging only the bottom base or alternate the opposite ends of the soda bottle.

There are, however, machines known in the art for applying decoration to a surface while orientated vertically. An example of such a machine is disclosed in U.S. Pat. No. 4,463,371. The present invention seeks to provide a workpiece manipulating device useful to supply workpieces to a discharge conveyor and/or from a supply conveyor at spaced apart time intervals in a reliable fashion and in an operative relation with a support structure used to move a workpiece in a decorating machine. In this regard, it is necessary to provide a manipulative structure suitable to supply or receive a succession of workpieces from a support structure such as vacuum chuck which is part of the printing machinery used to present the workpieces in succession to printing stations from supply and delivering conveyance structures having fixed a plane of workpiece support. It is inadequate to require changes to the elevation of the conveyor belt used to support the workpiece because, among other things, the destruction to the synchronous relation between the operation of the manipulator apparatus and the conveyor and the receiving site for the workpiece by a vacuum chuck of the printing machine. The removal of a workpiece from the supply conveyor or the placement of a workpiece on a delivery conveyor requires a manipulative operation dependent upon the height of the workpiece on the conveyor as well as the transverse dimensions along the height of the workpiece. A glass tumbler and more dramatically, a glass stemware have width dimension properties that are dramatically different, not only transverse but also must be orientated during the manipulation procedure so that gripper arms can pass freely into and out of supporting contact. It is a typical and most desirable to transport a tumbler while vertically orientated to minimize space requirements but orientated horizontal for the decorating process.

Certain workpieces because of their configuration and material of construction, such as glass tumblers which are tall truncated cones with a flat bottom, must be moved with great precision from a carrier in a decorating machine to a delivery conveyor. Ever changing variables from glass tumbler to a glass tumbler include surface irregularities at the touch sites where the glass tumbler will be supported by the gripping members used to unload the workpiece. Also the glass tumbler should move along a path of travel that avoids the possibility of impact with the conveyor structure used to discharge the tumbler to the decorating machine. Impact must also be avoided with the tumbler while a retention device used to hold the tumbler mover to the discharge site from the decorating process. The avoidance of impact is particularly acute to satisfy necessary operation speeds for an acceptable through-put capacity of the decorating machine. Operator fatigue precludes the use of workers to unload workpieces, such as glass tumblers, from a decorating machine. Moreover, in a decorating machine using silk-screen printing techniques, after the screens are provided with an ink supply, the printing operations should proceed without extended periods of interruption. Printing delays due to down time of allied equipment allow an unwanted dispersement of printing medium through the silk-screen without extraction of the printing medium from screen by a workpiece. The matter is particularly acute when, for example, multiple colors are printed using multiple printing stations. When four different colors are being printed in a single decorating machine, each of the four different printing stations for the various colors must be subject to a clean-up operation before the decorating machine can be placed back on a production basis. Restarting the printing operation after a delay requires cleaning smeared printing from workpieces which is very labor intensive.

In our U.S. Pat. No. 5,249,663 issued Oct. 5, 1993 there is disclosed an apparatus to load workpieces on a carrier for a decorator. The apparatus includes a conveyor to deliver a workpiece to a transfer site, a gripper including a displaceable gripper movable relative to a stationary gripper for supporting a workpiece at the discharge site, a swing arm supporting the gripper at one end thereof for movement between the workpiece transfer site and a workpiece loading position, an actuating lever movable with the swing arm for moving the displaceable gripper into a workpiece release position with the stationary gripper at the workpiece loading position, a drive coupled to the end of the swing arm opposite the gripper for reciprocating the swing arm between a workpiece receiving position and a workpiece discharge position, and cam drive to synchronize the operation of the drive for reciprocating the swing arm and the actuating lever for moving the displaceable gripper.

In such a loading system workpieces can be presented to a support structure of a decorating machine through the operation of the grippers and operation of the drive mechanism necessary to translate the gripper from the workpiece receiving position and a workpiece discharge position. In this loading mechanism the workpieces are always received at a designated workpiece receiving site that is fixed in relation to all other structure of the decorating machine so that there is no need to undergo costly and time consuming setup operations to accommodate changes from one dimensional characteristic workpiece to a different dimensional characteristic workpiece. When converting, for example, from one glass tumbler size to a different glass tumbler size, the gripper arms are adjusted to bring them into suitable gripping relation with the workpiece but there is no need to reposition the conveyor with respect to the support structure of the decorating machine for the workpiece to accommodate the change to the size of the workpiece. This is because the workpiece is engaged at a predetermined distance from the support surface of the conveyor and this predetermined distance remains uniform throughout the transporting operation to lift and transport the workpiece from the conveyor to the support structure for the decorating machine. The support structure in turn always receives the workpiece while the gripper arm is engaged with the workpiece at a never changing relation from the edge or rim of the workpiece by which it will be supported by both the conveyor and the support structure for the decorating machine.

In our co-pending patent application Ser. No. 882,939 filed May 14, 1992 now U.S. Pat. No. 5,33,720, there is disclosed a manipulator structure for loading and/or unloading a workpiece in a decorating machine by selective positioning of a gripping structure as an operative unit to accommodate workpieces of a variety of shapes and varying dimensions as an incident to the decorating process and in conjunction with a conveyor operative at a fixed, predetermined elevation. The loading operation and the unloading operation require suitable structure to accommodate the widely varying height dimensions of a given line of products to be processed on the decorating machine. While the manipulating structure for the loading operation may receive a workpiece while supported on the rim structure of the workpiece, preference or other considerations may dictate that the workpiece be supported on its conventional bottom. Thus, there will no longer exist a fixed and predetermined dimensional relation between the gripper at the rim of the workpiece by which is will be presented for support to a vacuum chuck by the manipulated structure. A similar relation also exists in the unloading phase of the decorating process wherein the dimensional relation between the workpiece as presented to an unloading structure changes with the height of the workpiece so that it is necessary to accommodate the varying workpiece height when depositing the workpiece on a conveyor. The dimensioned relationship between the gripper at the support site and the base of the workpiece changes with the size of the workpiece and so does the dimensional relationship change between the gripping site and the surface of the workpiece by which it will be supported during conveyance during unloading.

It is an object of the present invention to provide a workpiece manipulating apparatus that is radially convertible to deliver a workpiece in either of diverse workpiece orientations one of which is obtained according our aforementioned disclosure by U.S. Pat. No. 5,249,663 and the second of which is obtained by the disclosure by our co-pending patent application Ser. No. 882,939 now U.S. Pat. No. 5,333,720.

It is a further object of the present invention to provide an apparatus to selectively maintain the same or different surfaces by which a workpiece is supported while manipulated between horizontal and a vertical or a vertical and a horizontal attitude on conveyance structure.

SUMMARY OF THE INVENTION

More particularly according to the present invention there is provided an apparatus to selectively orientate workpieces undergoing manipulation, the apparatus including the combination of means for delivering a workpiece in a plane at a first orientation to a workpiece receiving site, gripper means including at least one displacable gripper for supporting a workpiece at the workpiece receiving site, pivot means including a pivot shaft coupled to at least one pivot arm for pivoting the gripper means between the workpiece receiving site and a workpiece transfer site, gripper positioning means supported by the pivot arm for interconnecting the gripper means with the pivot arm, means selectively operable for pivoting the gripper means at a predetermined fixed relation with the pivot arm while the pivot arm and the gripper means pivot between the workpiece receiving site and the workpiece transfer site for establishing one selective orientation of the workpiece, means selectively operable for rotatably positioning the gripper means relative to the pivot arm while the pivot arm and the gripper means pivot between the workpiece receiving site and the workpiece transfer site for establishing a second selective orientation of the workpiece, means for moving the displacable gripper into a workpiece gripping position at the workpiece receiving site and for moving the displacable gripper into a workpiece release position at the workpiece transfer site, means for conveying the workpiece in a second orientation at the workpiece transfer site in a plane along a path of travel, and means to position the pivot means to a preselected position between and relative to each of the means for delivering and the means for conveying by moving the pivot means toward or away from the means for delivering, the pivot means being moved to position the gripper relative to the workpiece on the means for delivering to compensate for varying length workpieces and for selectively establishing the workpiece receiving site, the pivot means being positioned to prevent damaging impact of the work piece with said means for conveying and means for delivering and without changing the distance between the plane of the means for delivering and the plane of the means for conveying.

BRIEF DESCRIPTION OF THE DRAWINGS

These features and advantages of the present invention as well as others will be more fully understood when the following description is read in light of the accompanying drawings in which:

FIG. 5 is an elevational view taken along lines V—V of FIG. 4;

DETAILED DESCRIPTION OF THE PREFERRED EMBODIMENTS

Figure 1:
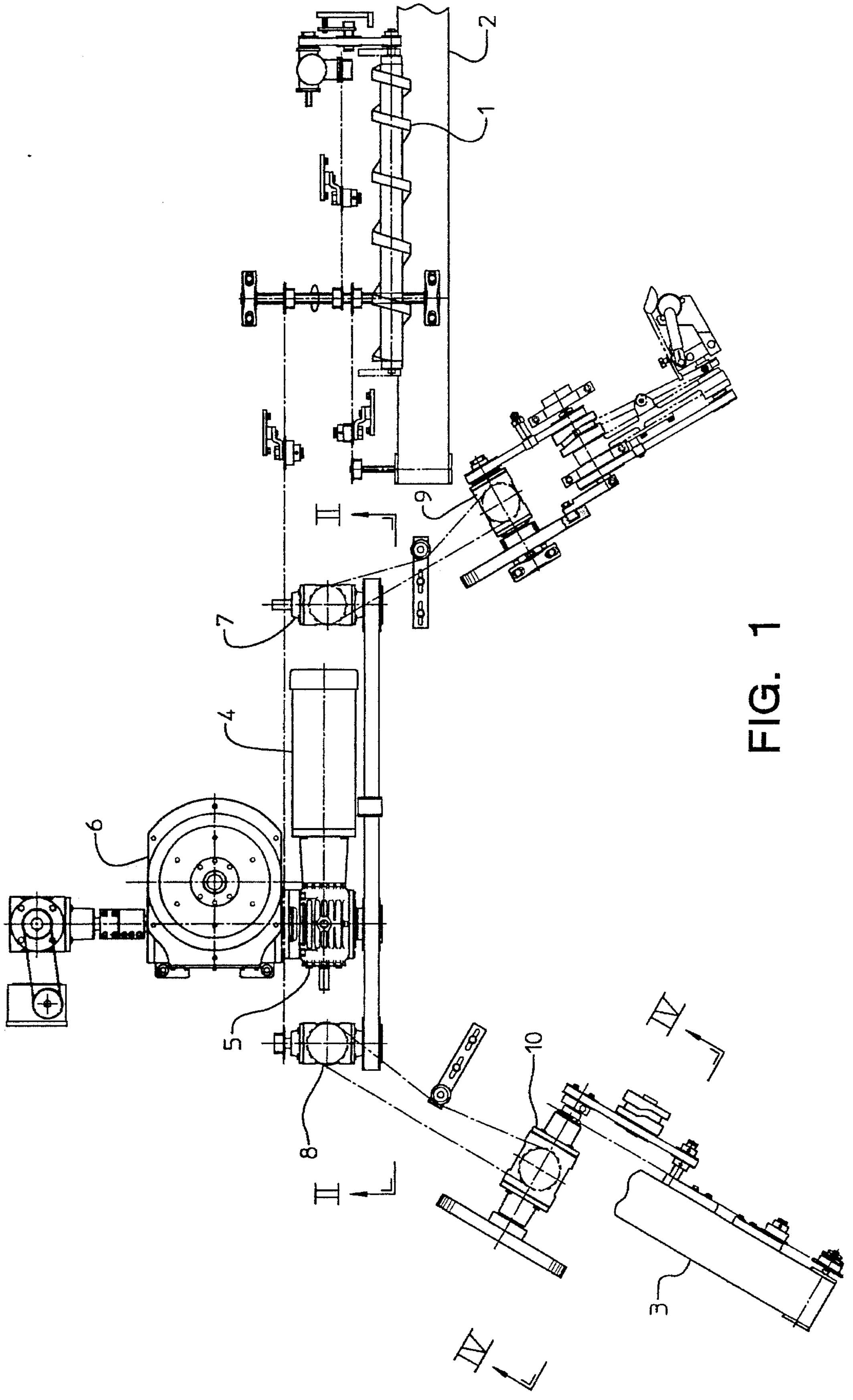
FIG. 1 is a plan view schematically illustrating the drive system for the entire decorating machine including the manipulating apparatus according to the present invention.
Figure 3:
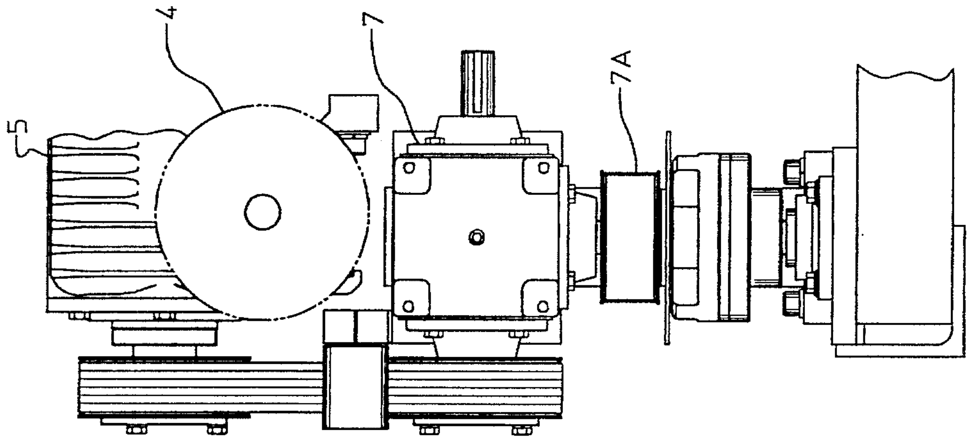
FIG. 3 is a elevational view taken along lines III—III of FIG. 2.
Figure 2:
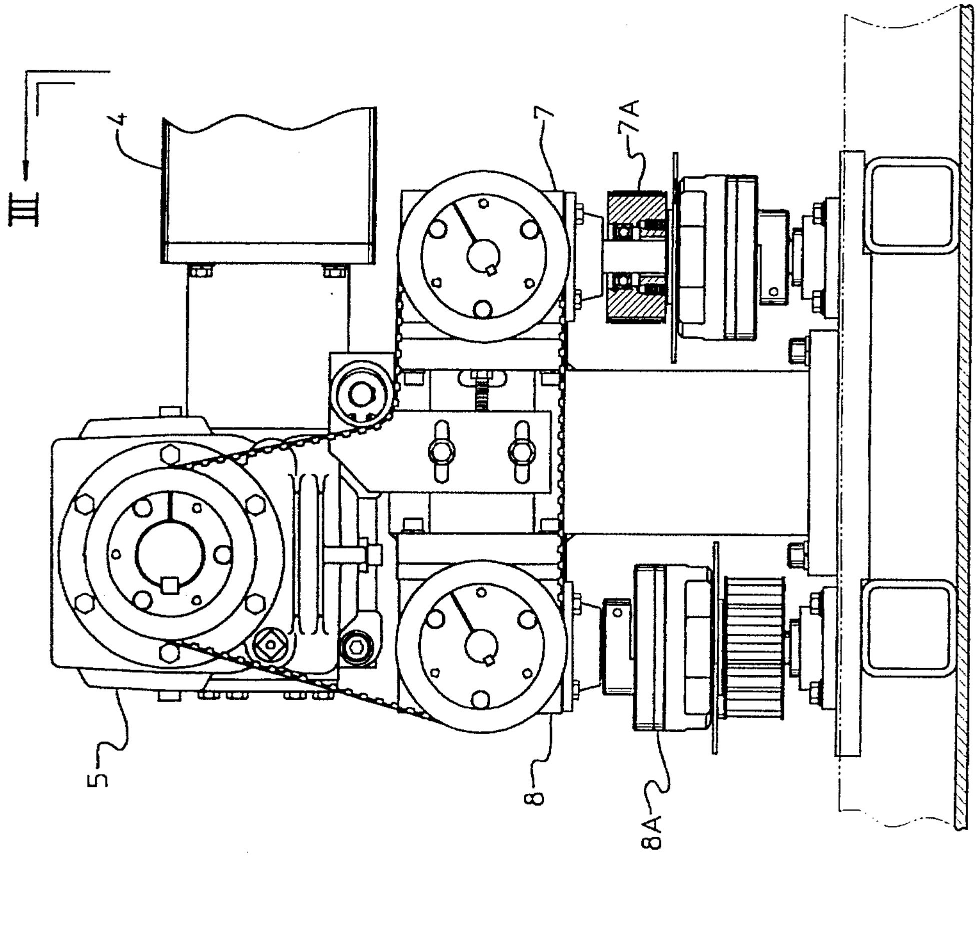
FIG. 2 is an elevational view taken along lines II—II of FIG. 1.

In FIGS. 1, 2 and 3 there is illustrated the arrangement of machinery for supplying and discharging workpieces from a decorating machine which is one of any diverse structure, the operation of which is enhanced through operation of the apparatus. In the printing process of the apparatus of the present invention, there is a constant timed relationship between all movements of the workpiece, hereinafter called tumbler for convenience, commencing with the advancement of the workpiece by a timing lead screw 1 on a conveyor 2 and ending with depositing of the tumbler on a delivery conveyor 3. The timed relation exists by virtue of the fact that a single drive motor 4 is used for the entire decorating system. The motor 4 is mounted on the side of gear drive 5. The gear drive has one output coupled to an indexing turret drive 6 having an output shaft by which other drives are supplied with power for the printing operations. The gear drive 5 has a second output shaft provided with a pulley that is in turn coupled by a belt to two spaced apart gear drives 7 and 8. Gear drive 7 has multiple output shafts, one of which provides a power take-off system to operate the timing lead screw 1 as well as the belt conveyor 2. A second power take-off from gear drive 7 is coupled by a belt to a gear drive 9 which forms part of a loading drive apparatus incorporating a manipulating device according to the present invention. Gear drive 8 is connected by a belt to a gear drive 10 which is part of an unloading apparatus including a manipulating apparatus according to the present invention. It is to be understood, however, that the manipulating apparatus may be applied to either the loading system or the unloading system for tumblers or both systems. In FIG. 2, a drive output shaft for each of the gear drives 7 and 8 is coupled to a overload clutches 7A and 8A, respectively, with the output element of the overload clutch being coupled to a drive pulley. The overload clutches are protective elements in the drive system to avoid overloading the drive in the event of a jam or misfeading of workpieces such as ware, particularly tumblers T.

In FIGS. 4–8 there is illustrated a preferred embodiment of a manipulator apparatus which will be described for descriptive purposes only for an unloading operation for tumblers from vacuum chucks of a printing machine. A foundation base 11 carries turret drive 6 which indexes a turret plate 12 in a manner per se well known in the art. The turret plate supports at each of angularly spaced apart sites a support structure including a vacuum chuck 13 used to releasably support a tumbler T, in a manner per se well know in the art. The vacuum chuck is rotated about an axis 14 inclined to the horizontal at a shallow angle, for example, at 4° so that the truncated conical surface of the tumbler is presented horizontally to the printing stations for the printing operation by the use of silk screen printing techniques. When the tumbler surface to receive printing is cylindrical, which will rotate about a horizontal axis. When the printing operation includes decorations involving more than one color, than multiple printing stations are situated about the periphery of the turret plate 12. The tumblers are carried from the last of the printing stations to a unloading position established by the operation turret drive 6 to stop rotary movement of the turret.

Figure 4:
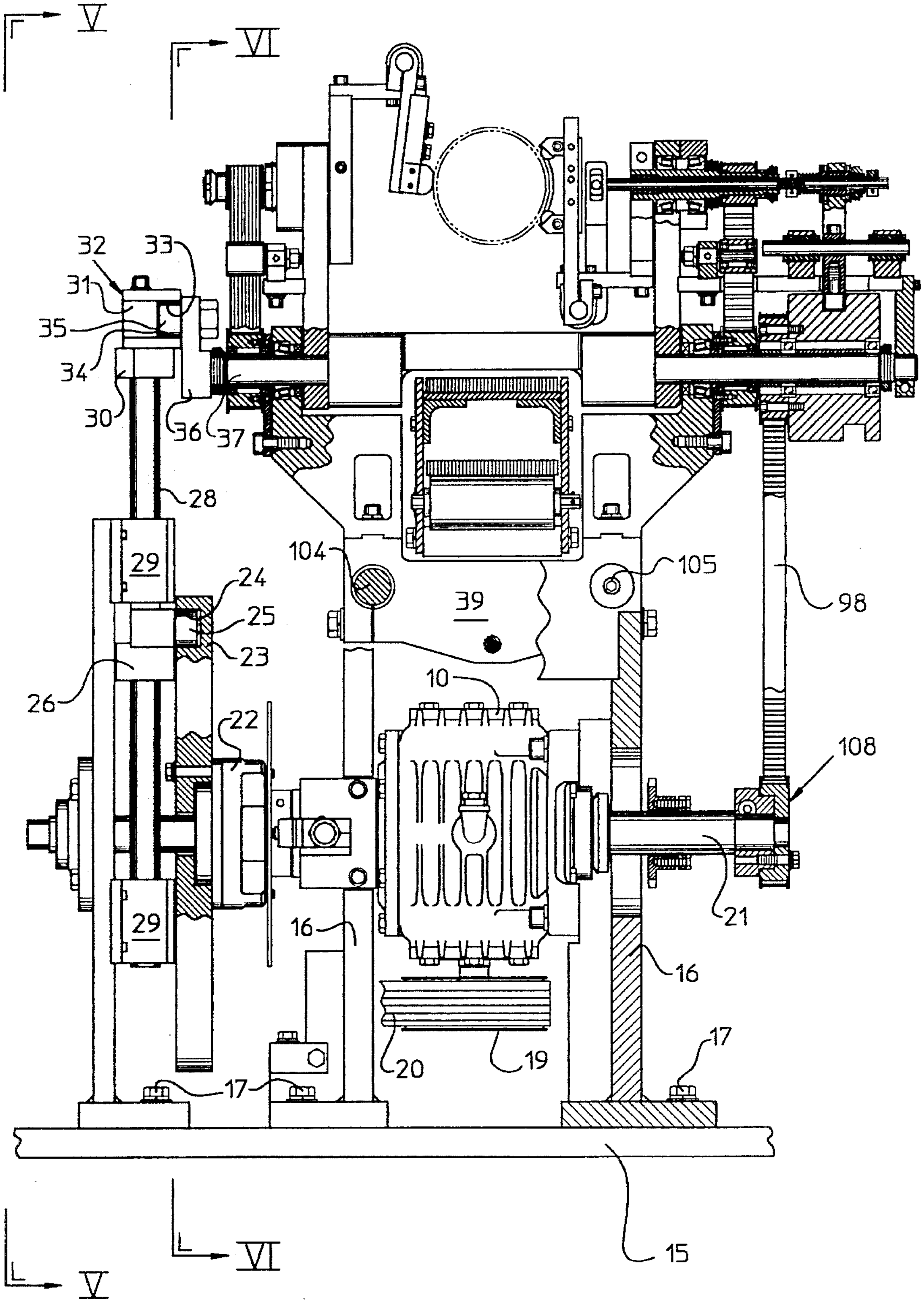
FIG. 4 is an elevational view in section taken along lines IV—IV of FIG. 1.
Figure 7:
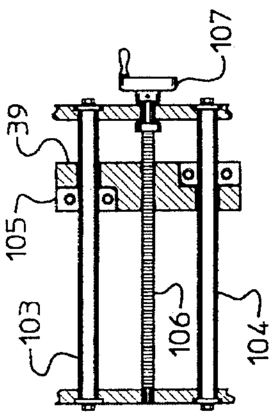
FIG. 7 is a sectional view taken along lines VII—VII of FIG. 6.

At the discharge station there is located an manipulator apparatus that is supported by a sub-base 15 extending to the foundation base 11. The sub-base supports an upstanding housing 16 which is attached to the sub-base by bolts 17. The housing 16 supports the gear drive 10 having a pulley 19 secured to the drive input shaft thereof. The pulley 19 is driven by a belt 20 extending to a pulley on the output shaft of gear drive 8 (FIG. 1). The gear drive 10, as shown in FIG. 4, includes within a drive housing, gears that are driven by an output shaft 21. Shaft 21 is secured to a overload clutch 22 which is in turn mounted to the face surface of cam plate 23. Machined into an outwardly directed face surface of the cam plate is a cam track 24 which receives a follower roller 25 carried by a bearing block that is in turn mounted to a yoke bar 26. The yoke bar is connected by screw operated clamps 27 at its opposite ends to spaced apart vertically arranged actuator rods 28. The actuator rods are supported by linear bearings 29 above and below the yoke bar 26 for reciprocating movement of the actuator rods 28 in response to motion imparted to the bar 26 by the follower 25 in the cam track 24. The upper ends of the actuator bars 28 are joined together by a tie bar 30 to which a raiser plate 31 is secured and in turn supports a horizontally arranged linear raceway defined by a "U" shape channel section 32.

Figure 9:
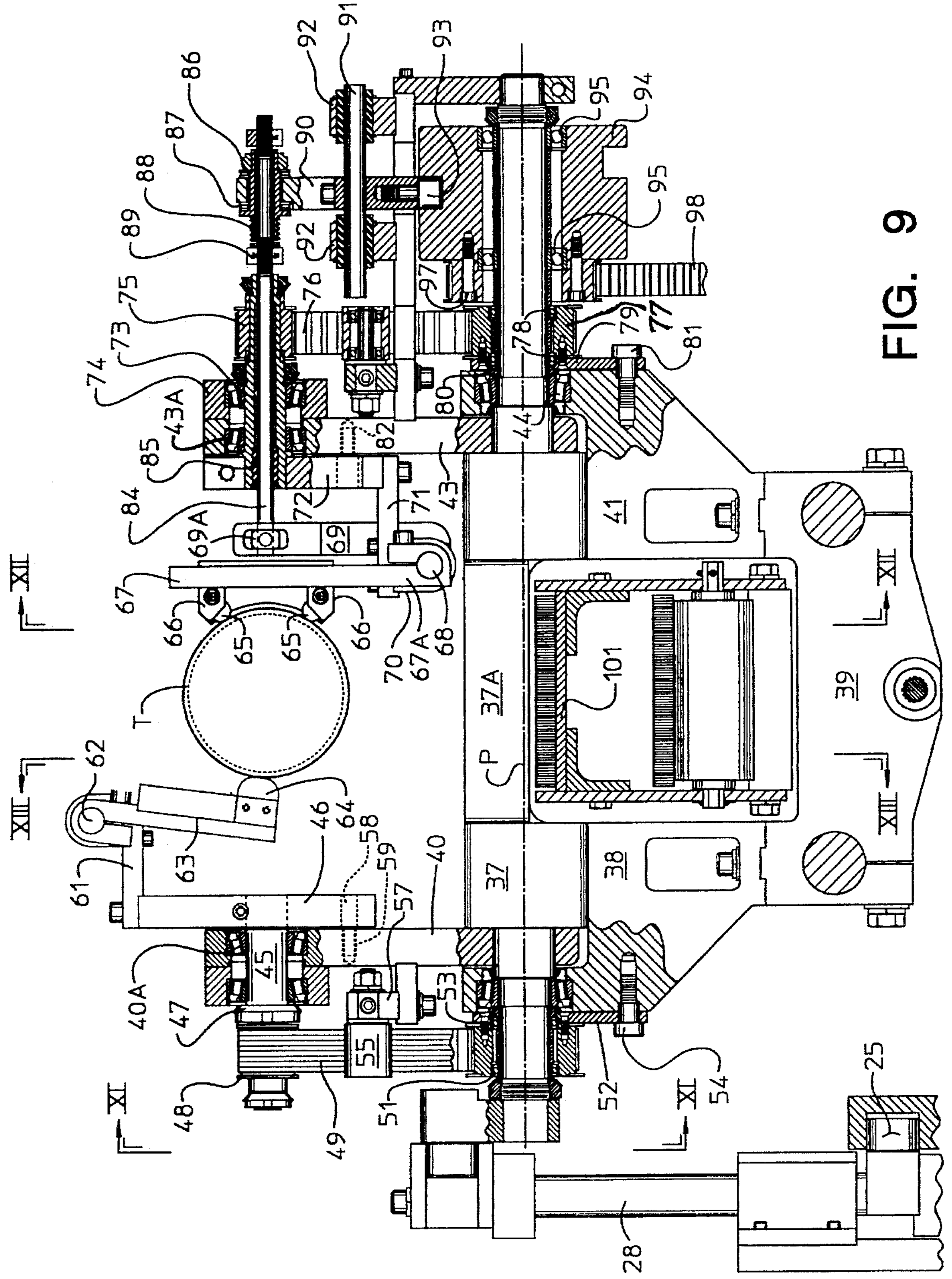
FIG. 9 is an enlarged view similar to FIG. 4 of the upper portion of the workpiece manipulation apparatus of the present invention.
Figure 11:
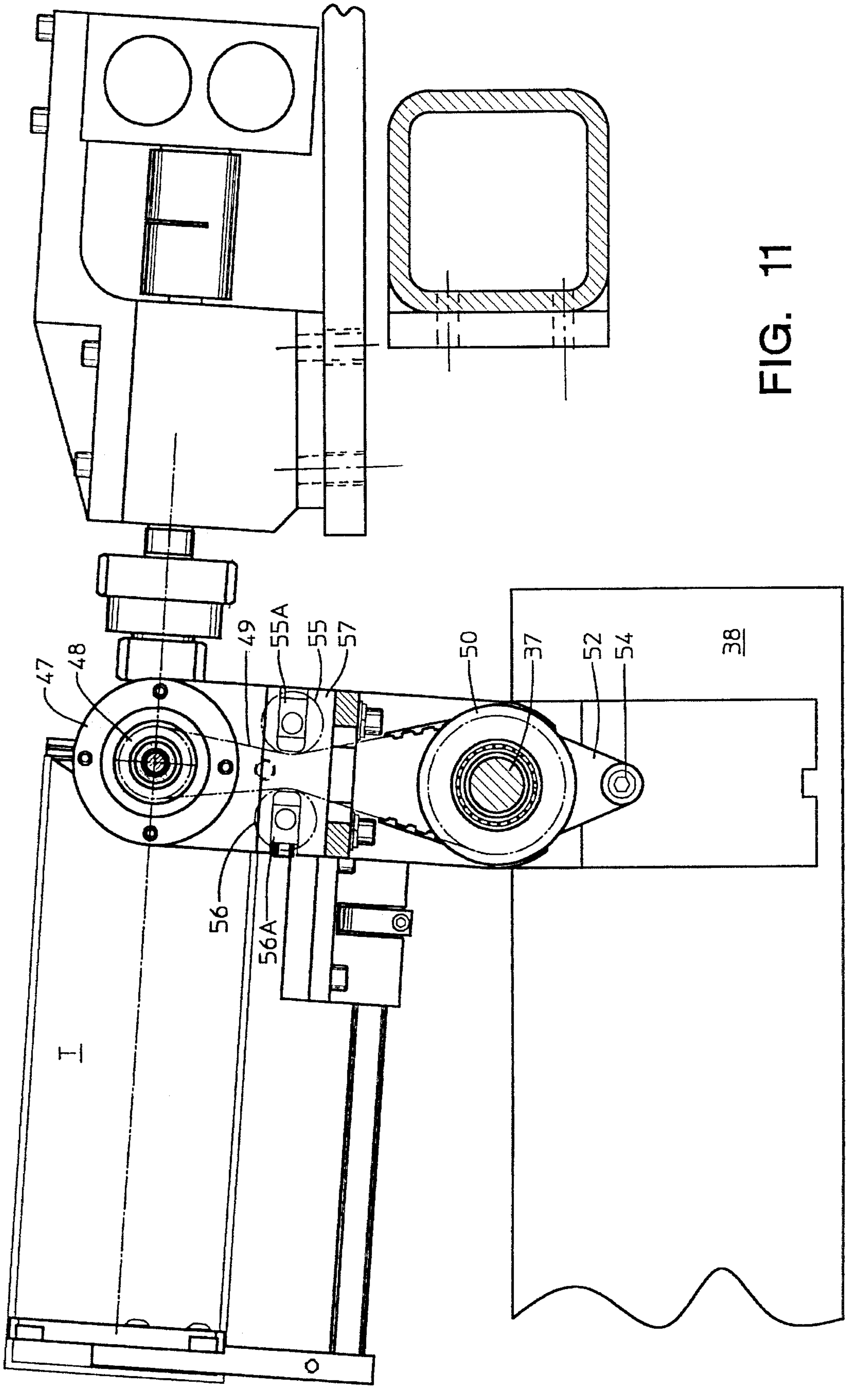
FIG. 11 is an enlarged elevational view taken along lines XI—XI of FIG. 9

Between the actuator surfaces 33 and 34 of the channel section 32 there is received an actuator roller 35 mounted on one end of a crank arm 36 secured to a pivot shaft 37 rotatably supported by an anti-friction bearing in one leg 38 of a U-shaped yoke 39. As best shown in FIG. 9, a pivot arm 40 is secured to a portion of shaft 37 protruding beyond the anti-friction bearing in leg 38. Shaft 37 traverses the gap between leg 38 and a leg 41 of yoke 39 and in this gap the shaft has a reduced cross sectional area 37A to accommodate an upper part of delivery conveyor 3. Adjacent leg 41 is a pivot arm 43 mounted to shaft 37. Shaft 37 extends beyond pivot arm 43 to an anti-friction bearing 44 mounted in leg 41 of the U-shaped yoke 39. Shaft 37 is supported by the spaced apart bearings in the yoke arms to pivot about a pivot axis P. Pivot arms 40 and 43 are equal in length and supported in the projected ends of these arms are anti friction bearings 40A and 43A respectively. Bearing 40A rotatably supports a arbor 45 secured to the central portion of a swing arm 46 and having an extended part rotatably supported by a supplemental bearing assembly 47 from which there extends a free end portion of the arbor 45 having a drive pulley 48 mounted thereon. An endless belt 49 extends to a idler pulley 50 rotatably supported by spaced apart bearings 51 that are carried on the portion of pivot shaft 37 extending between crank arm 36 and leg 38. In a gap formed between idler pulley 50 and leg 38 there is located a idler pulley control arm 52 which is mounted to a side face of pulley 50 by fasteners 53. As will be described in greater detail herein after, arm 52 forms part of a drive control system used to selectively orientate tumblers undergoing manipulation. For this selection process there is provided a removable fastener 54 which can be passed through an opening in a leg portion of arm 52 into threaded engagement with threads in a tap hole formed in leg 38 as shown in FIG. 9. The belt 49, as shown in FIG. 11 is maintained under controlled tension by operation of belt tensioning rollers 55 and 56 situated at the opposite side of the belt and adjustably position by mounting blocks 55A and 56A respectively carried on a support frame 57.

Figure 10:
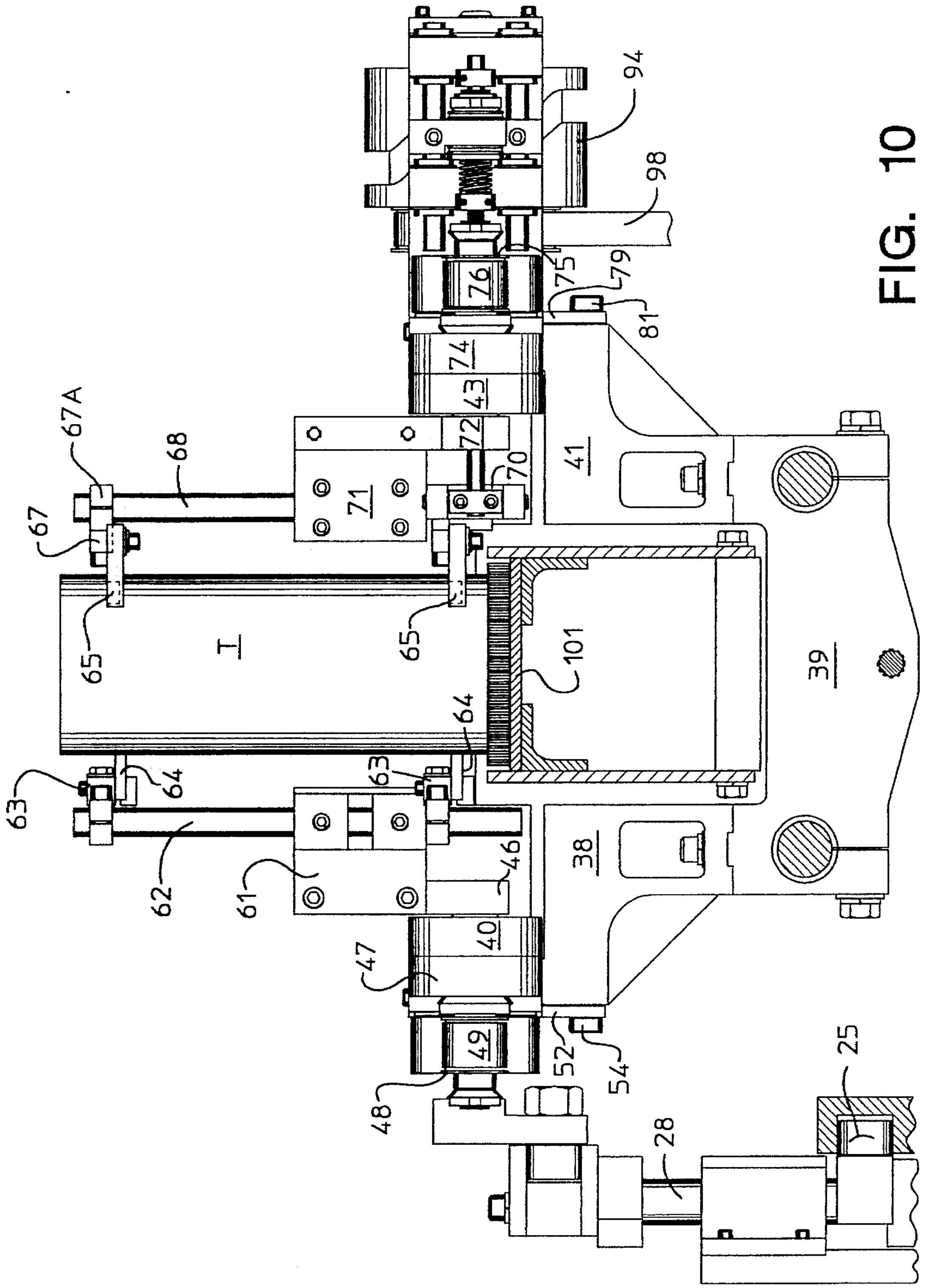
FIG. 10 is a view of the apparatus shown in FIG. 9 after a workpiece has been removed from a vacuum chuck, reorientated and deposited on a delivery conveyor.
Figure 12:
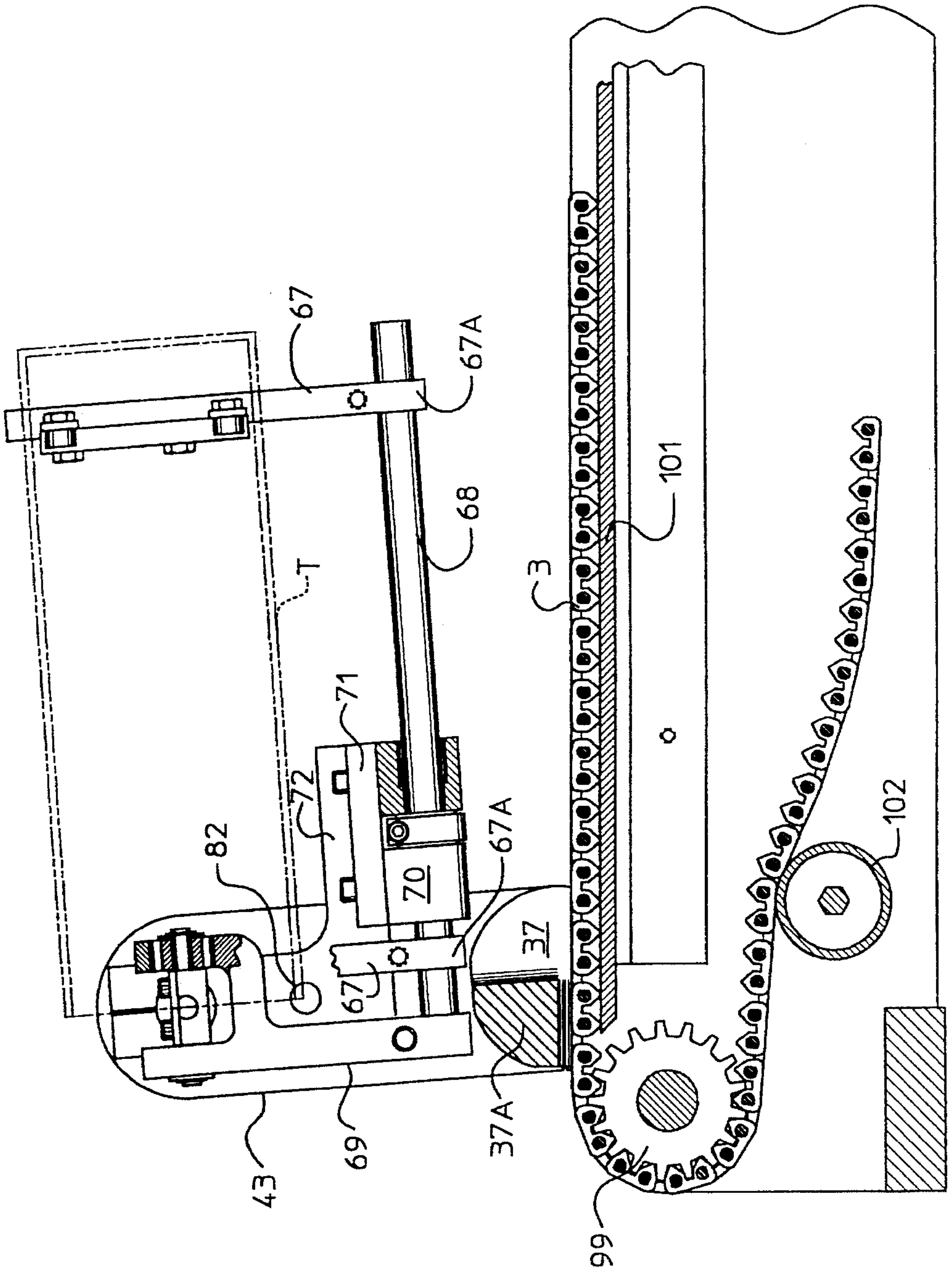
FIG. 12 is a sectional view taken along lines XII—XII of FIG. 9.
Figure 13:
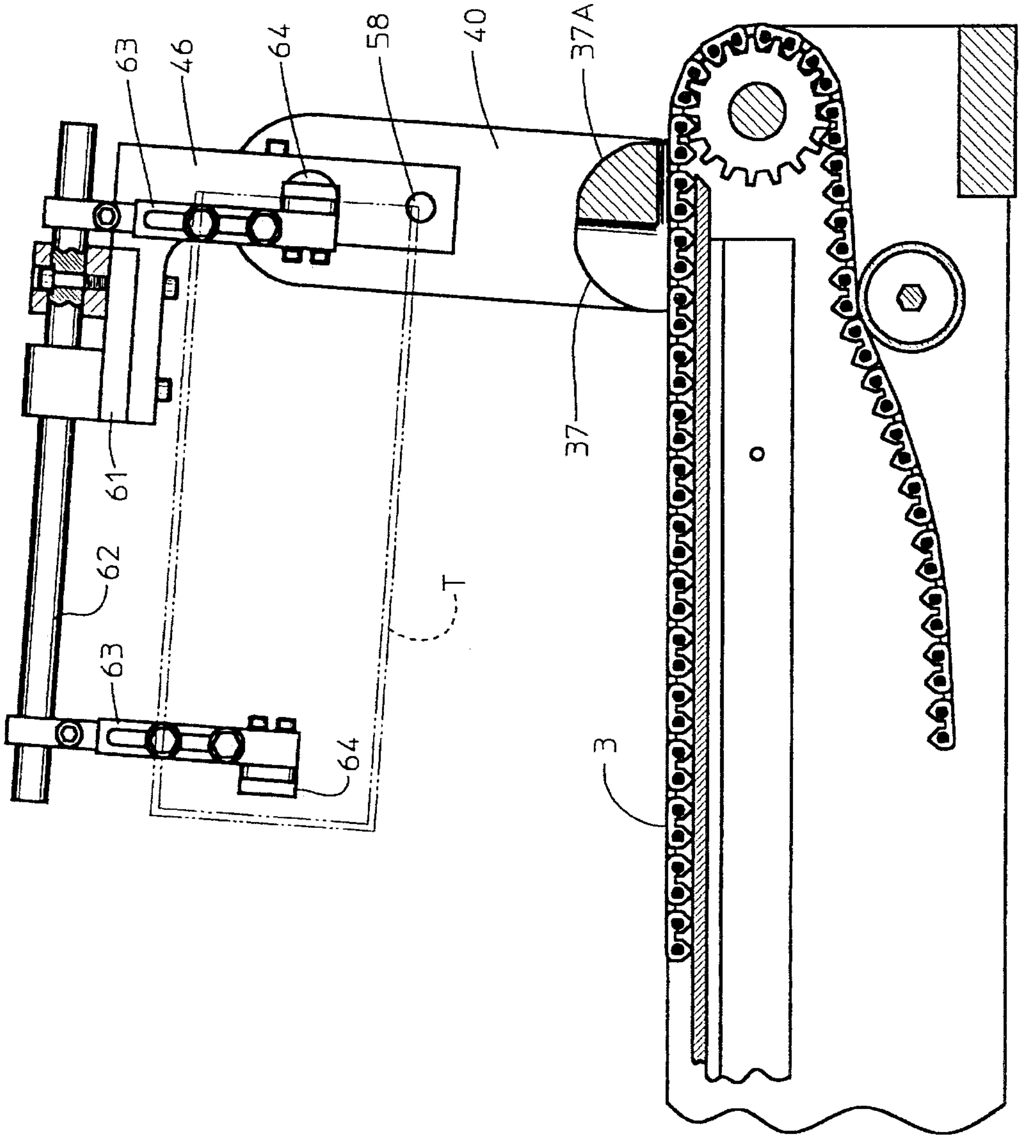
FIG. 13 is a sectional view taken along lines XIII—XIII of FIG. 9.
Figure 14:
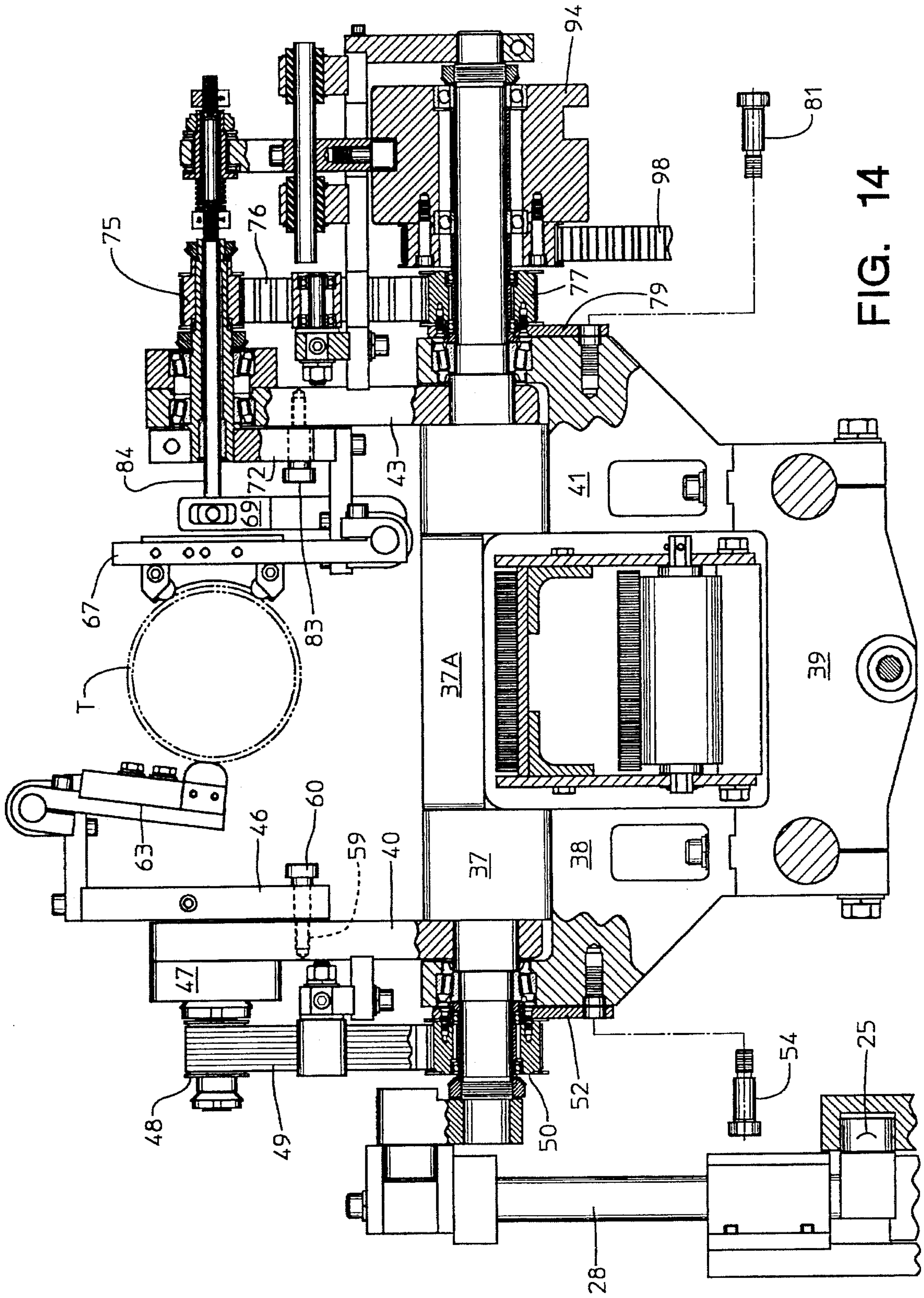
FIG. 14 is a view similar to FIG. 9 and illustrating the operative condition of the parts of the manipulating apparatus for orientating workpieces in an alternative manner in that performed by the in the arrangement shown in FIG. 9.

As shown in FIG. 14, a further part of the drive control system used to selectively orientate tumblers undergoing manipulation is provided by forming a drilled hole in one end portion of arm 46 that can align with a tapped hole 59 in pivot arm 40 for a removable fastener 60. As shown in FIGS. 9, 10 and 13, arm 46 at its end portion opposite drilled hole 58 carries a mounting block 61 which serves to support a shaft 62 used for selectively positioning arms 63 each provided with a gripper pad 64. The gripper pads 64 are positioned to engage a peripheral surface of tumbler T at one side thereof which is opposite to touch sites formed by pairs of spaced apart elastomer pads 65 mounted on support blocks 66 that are in turn supported by carrier arms 67, as best shown in FIGS. 9, 10 and 12. Arms 67 have a clamp section 67A for securing the arm to a support shaft 68. Shaft 68 is secured to an end portion of a throw arm 69 and rotatably supported by a carrier block 70 joined by a mounting block 71 to one end of a swing arm 72. The opposite end of arm 72 is clamped on to a end portion of a tubular shaft 73 which is rotatably supported by bearing 43A in pivot arm 43 with additional rotational support being supplied by a supplemental bearing assembly 74. A portion of the tubular shaft extending from supplemental bearing assembly 74 serves for mounting a drive pulley 75. An endless belt 76 extends to a idler pulley 77 rotatably supported by spaced apart bearings 78 carried on the portion of pivot shaft 37 extending outwardly from leg 41. In a gap formed between idler pulley 71 and leg 41 there is located a idler pulley control arm 79 which is mounted to a side face of pulley 77 by fasteners 80. As will be described in greater detail herein after, arm 79 forms part of a drive control system used to selectively orientate tumblers undergoing manipulation. For this selection process there is provided a removable fastener 81 which can be passed through an opening in a leg portion of arm 79 into threaded engagement with threads in a tap hole formed in leg 41 as shown in FIG. 9. The belt 76, as shown in FIG. 11 receives controlled tension by operation of belt tensioning rollers forming part of a belt tensioner constructed in an identical manner for controlling tension on belt 49 by rollers 55 and 56. A further part of the drive control system used to selectively orientate tumblers undergoing manipulation is provided by forming a drilled through hole in one end portion of arm 72 that can align with a tapped hole 82 in pivot arm 43 for a removable fastener 83 shown only in FIG. 14. Arms 63 and 67 are suitably positioned by their mounting structure which is carried by swing arms 46 and 72 respectively to impose sufficient pressure on a tumbler to establish a gripper force to hold the tumbler between the opposed gripper arms while the tumbler is manipulated between the vacuum chuck and the conveyor. The tumbler is released from the gripping force by pivoting carrier arm 67 away from the tumbler through the operation of a release mechanism which can be best seen in FIGS. 4, 9 and 10. The release mechanism includes a slide block 69A located in the slotted opening in the end of throw arm 69 as best shown in FIG. 9. The slide block 69A is mounted on the end of a rod 84 that is in turn supported by a linear bearings 85 mounted in the internal cavity of tubular shaft 73. The free end of the push rod 84 is fitted with a linear bearing 86 which in turn carries a thrust collar 87 having a flange engaging a return spring 88 that is maintained under a predetermined tension while carried on rod 84 by a split collar 89. The thrust collar serves for mounting the free end of a drive arm 90 constrained to linear movement by a guide bar 91 secured in a central opening in the drive arm while supported by linear bearing assemblies that engage with opposite end portions of guide bar 91. The drive arm 90 supports a follower roller 93 in a manner to engage in a cam track formed in a cam roller 94. The cam roller is supported for rotary movement by spaced apart anti-friction bearings 95 mounted on shaft 37. Joined to the cam roller 94 and supported by one of the bearings 95 is a pulley 97 having a toothed surface engaged with the teeth on a belt 98 which extends along the U-shaped housing 39 downwardly and into a driving relation with a pulley mounted on shaft 21 of the drive gear 10 (FIG. 4).

Figure 6:
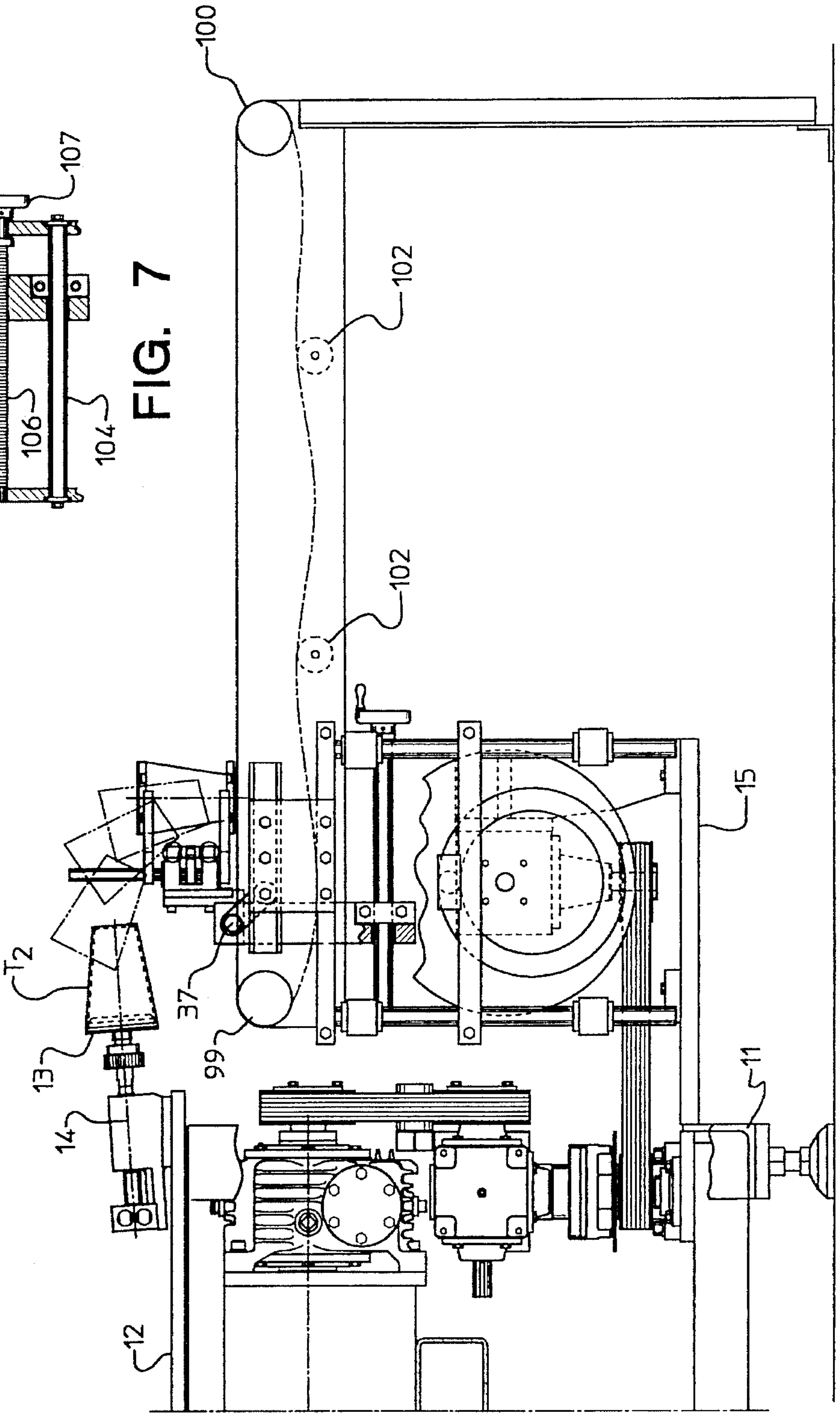
FIG. 6 is an elevational view similar to FIG. 5 but taken along lines VI—VI of FIG. 4.

As best shown in FIGS. 5 and 6 the conveyor belt 3 extends between rollers 99 and 100. The belt 3 forms spaced apart feed and return runs of the belt extending in the space between legs 38 and 41 of the U-shaped yoke 39. The upper run of the conveyor belt is stabilized by a base plate 101, whereas the lower run is supported by spaced apart rollers 102.

A feature of the present invention is the provision of a construction to allow the pivot shaft 35 which is part of the support structure for the gripper arms to be moved toward and away from the vacuum chuck in a horizontal direction to compensate for varying lengths of tumblers and for selectively establishing a tumbler receiving site to accommodate an operator controlled selection for alternative orientation of the tumblers undergoing manipulation. One of the alternative choices available for orientating tumblers is to move the pivot 37 into a position where the surface of the tumbler by which it is supported always remains the same before and after the manipulation between the vacuum chuck and the delivery conveyor in respect to an unloading apparatus and a supply conveyor and a vacuum chuck in respect to a tumbler loading apparatus. In the alternative selection, the surface by which the tumbler is supported by the vacuum chuck during unloading is opposite to the surface by which the tumbler is supported on the delivery conveyor in respect to an unloader. With respect to a loader, the surface of the work piece engaged with the supply conveyor is opposite to the surface by which the tumbler is supported on the vacuum chuck.

For this purpose yoke 39, as best shown in FIGS. 4, 5, 6 and 7, is provided with spaced apart horizontal bores into which there are received guide rods 103 and 104. Counter bored portions in the cross heads provide sites for receiving clamps 105 that are operated by a threaded fastener to affix the cross head to the support bars once the cross head has been positioned through operation of a feed screw 106. The feed screw is engaged in a threaded opening formed in the yoke and arranged parallel to the guide rods 103 and 104. The ends of the guide rods and the feed screw are supported by spaced apart walls of the upstanding housing 16. The feed screw has an end portion protruding from a walls where it is fastened to a hand wheel 107. By operation of the head wheel, once the clamps are released, the feed screw operates to move the U-shaped yoke and thereby also pivot 37 horizontally so that when the gripper arms engage the tumbler, they will be so positioned in relation to the bottom of the tumbler that the tumbler can be manipulated from the chuck to the conveyor. The manipulative movement terminates as the bottom of the tumbler rests without impact on the conveyor.

Figure 8:
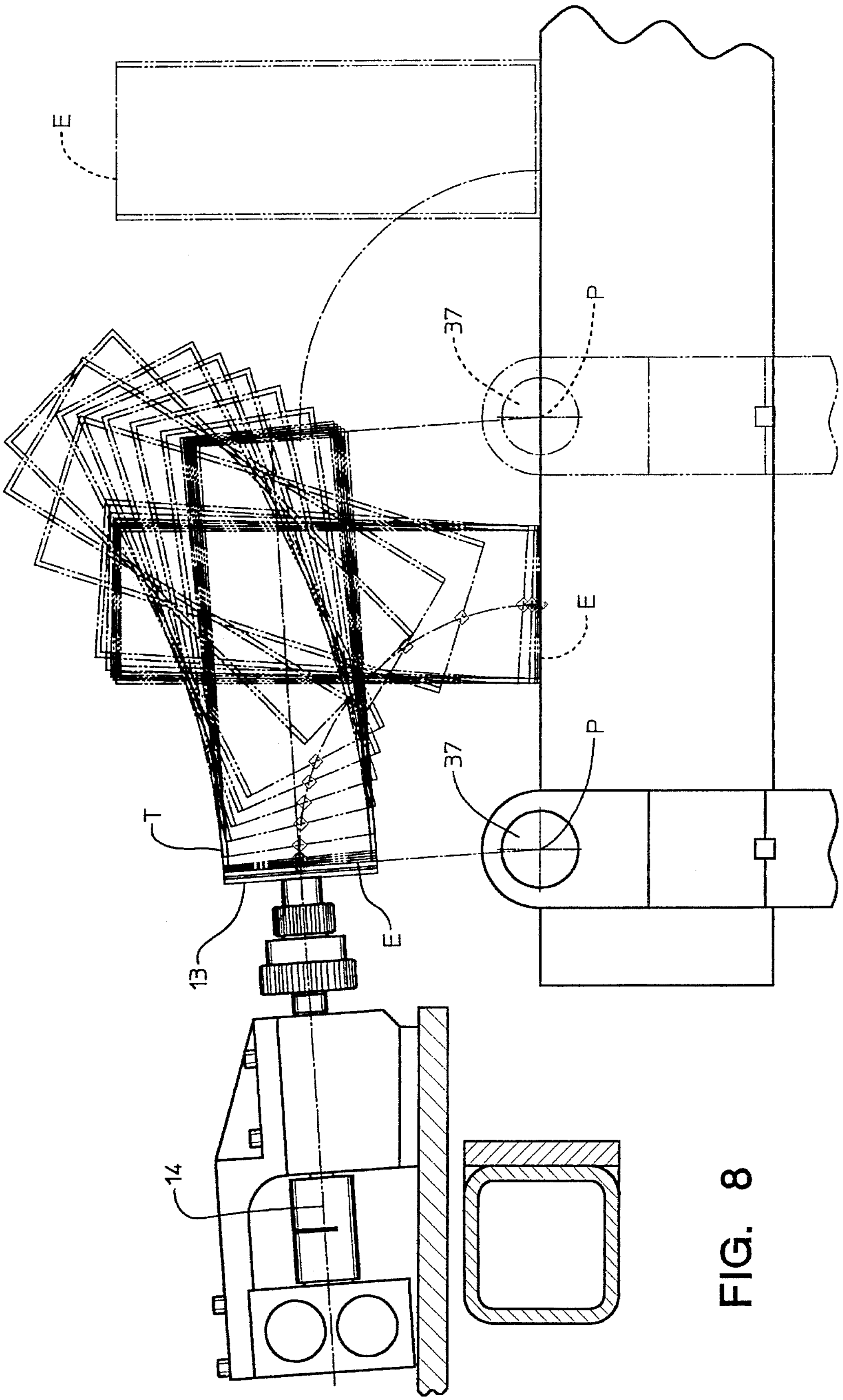
FIG. 8 is an enlarged view illustrating the alternative paths of movement according to selective orientation for a workpiece undergoing manipulation according to the present invention.

In FIGS. 5 and 8, the pivot 37 is positioned by the yoke in a position where it is most remote in a horizontal direction from the chuck 13. In this relation, the tumbler T has a greatly extended height. On the other hand, when a tumbler is short as compared with the height of the tumbler shown in FIG. 6, pivot axis P defined by the location of pivot 37 is advanced toward the chuck into a relationship shown in FIG. 6 where a tumbler $T_2$ is shown in a manipulative position between the chuck 13 and the conveyor. In order to accommodate the pivotal motion of the pivot axis P and its support drive structure, it is necessary to maintain a timed relation between the operation of the gripper arms and their pivotal movement. A phase adjusting pulley 108 can be angularly positioned on a hub to consistently maintain a predetermined timed relation between the cam plate 23 and cam roller 94. This is because as the U-shaped yoke is moved linearly, pulley 97 undergoes an angular change with respect to the drive pulley on gear drive 10.

The manipulative operation for transporting a tumbler from a generally horizontal orientation into a generally vertical orientation occurs by swinging the pivot shaft 37 about pivot P with an arcuate movement causing vertical displacement of the channel section 32 in response to reciprocating movement by actuator rods 28. Rods 28 are controlled by the configuration of the cam track 24 to displace the follower 25 by rotation of the cam plate 23.

According to the present invention, a cost saving advantage is provided by enabling the use of duplicate manipulating apparatus as described hereinbefore for use to carry out the required tumbler manipulation for a loading operation and/or an unloading operation with respect to a decorating machine. Selective orientation of the tumbler is made possible to allow operation as described herein before in regard to FIGS. 5 and 6 whereby the mouth of a tumbler when supported by a vacuum chuck does not become the support surface for the tumbler on the delivery conveyor but instead the conventional bottom wall of the tumbler becomes the support surface. In this unloading operation, the pivot 37 is moved to accommodate the particular height of the tumbler so that damaging impact with the delivery conveyor can be avoided. The pivot 37 is similarly moved when loading tumblers of diverse heights from a supply conveyor on to the vacuum chucks. For tall tumblers pivot 37 would be moved away from the vacuum chuck to a preselected point so that when the tumbler supported by its bottom wall on the supplied conveyor is manipulated into a position for engagement with the vacuum chuck no damaging impact will occur. When according to FIG. 6 the tumbler is short the pivot 37 will be advanced toward the vacuum chuck to compensate for the reduced height of the tumbler. These manipulative operations require that the gripper arms 63 and 67 pivot in unison with pivot arms 40 and 43. Thus as shown in FIG. 14, fasteners 60 and 83 are used to interlock the swing arms 46 with pivot arm 40 and swing arm 72 with pivot arm 43. The drive pulleys 48 and 75 must be allowed to operate as idler pulleys and for this purpose, fasteners 54 and 81 must be removed from the their respective tapped holes legs 38 and 41 whereby idler pulley control arms 52 and 79 oscillate with idler pulleys 50 and 77 during pivotal movement of the pivot arms. The present invention provides for an alternatively selectable operation of the manipulating apparatus to allow that a tumbler or other ware can be manipulated from a receiving station to a delivery station in which the surface by which the tumblers supported at the receiving station is the same surface by which the tumbler is supported at the delivery station. In this regard as can be seen in FIG. 8, chuck 13 is depicted supporting the rimmed edge E forming the mouth of tumbler T. Pivot axis P of pivot shaft 37 is moved to a position as shown so that the gripper arms can be brought into supporting contact with the tumbler T and through operation of an alternative drive arrangement the arms undergo motion causing the tumbler to follow a path of travel sequentially illustrated by broken line positions in FIG. 8 concluding when the edge E of the tumbler coming to rest on the conveyor without damaging impact therewith. This alternative drive arrangement of the arms is accomplished through a minimum of effort by simply removing the removable fasteners 60 and 83 from their positions as shown in FIG. 14 whereby swing arms 46 and 72 assume only a pivotal relationship with pivot arms 40 and 43. Fasteners 54 and 81 are put into place to interlock the idler pulley control arms 52 and 79 with the respective legs 38 and 41 of the yoke. This condition of parts is shown in FIG. 9 and brings about an all together different swinging motion of the tumbler support arms during movement of the pivots from a tumbler receiving position to a tumbler delivery position. In this regard as pivot arms 40 and 43 move about axis P due to rotation of pivot 37, a rotational driving force is imparted to swing arms as the drive pulleys 48 and 75 move in an orbital fashion about an arc formed by the pivot arms. The drive pulleys are caused to rotate by their respective belts because the idler pulleys remain fixed against rotation by operation of fasteners 54 and 81.

Figure 15:
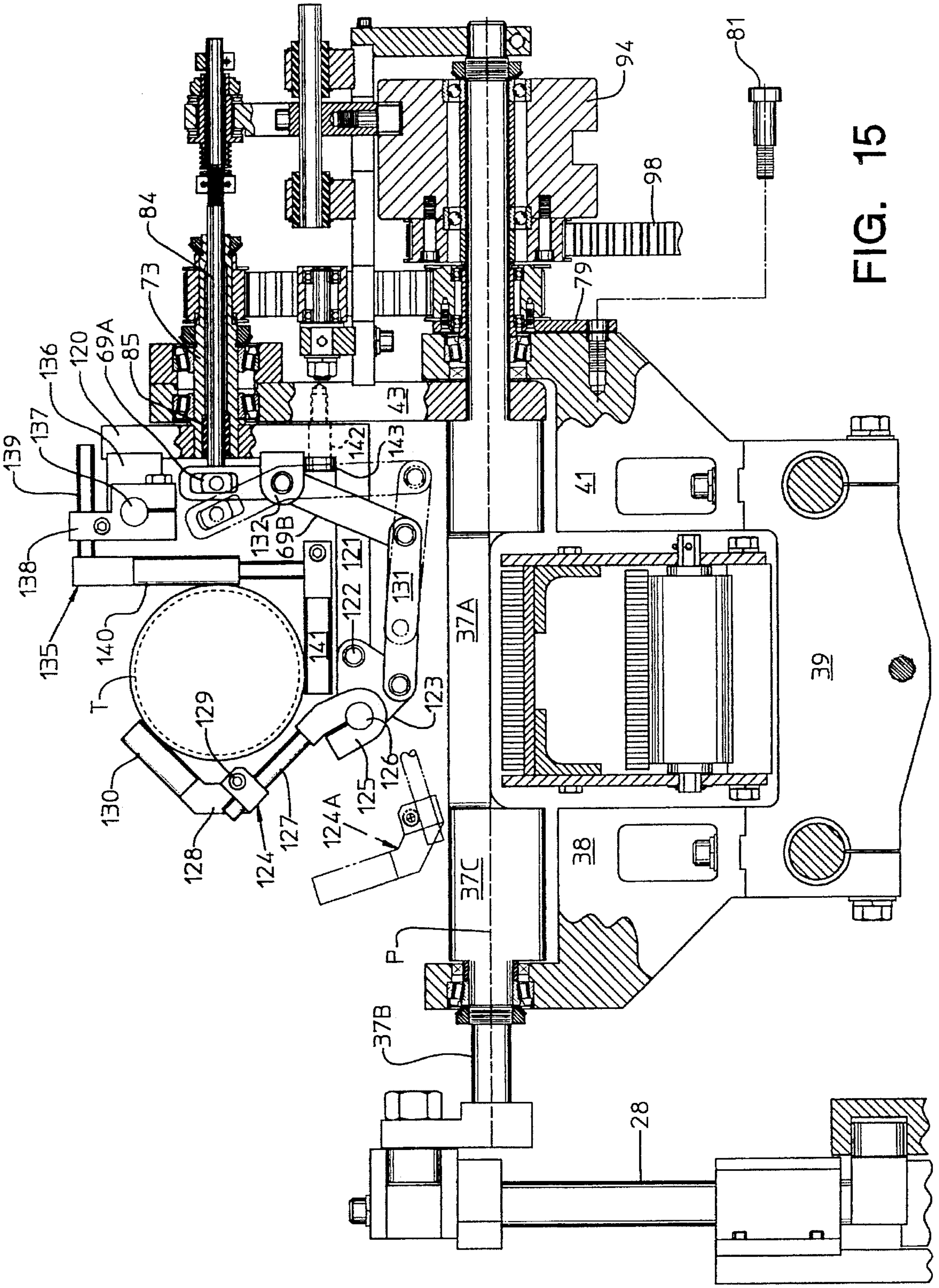
FIG. 15 is a view similar to FIG. 9 and illustrating a first alternative embodiment of the present invention.

The embodiment of the present invention described here and before can be modified to provide additional features and advantages in one such modified embodiment is shown in FIG. 15 wherein the grippers used to engage and release the tumblers have their origin of support at only one side of the tumbler in this embodiment many parts their relationship with other parts and operation are identical with disclosure herein before and accordingly like references numeral have been applied to such parts. Shaft 37B has been modified to provide that an enlarged portion 37C extending from portion 37A to leg 38. The portion of the tubular shaft 73 extending from pivot arm 43 is secured to a generally L-shaped swing arm 120 which has a horizontally extending leg 121 that carriers a pivot shaft 122. Shaft 122 supports a toggle link 123 that can swing about shaft 122 for position a moveable gripper assembly 124. Assembly 124 includes a clamp 125 used to mount the shaft 126 forming part of the toggle link 123. Clamp 125 carries a rod 127 to which their is selective position a gripper arm 128. Arm 128 is fixed in position in rod 127 by a clamp 129 so as to position a gripper roller 130 having an elastomer sleeve for contacting the tumbler T. The toggled link 123 is pivoted above shaft 122 by throw arm 69B having a lower portion connected by a link 131 to a toggle link. The throw arm 69B is pivotally supported by a bracket 132 fasten to swing arm 120. The upper portion of throw arm has a slotted opening into which there is received the slide block 69A where by rod 84 which is moved in the direction of its extended length by operation of cam roller 94 and supported by linear bearing 85 positions the moveable gripper assembly 124 into a position shown in FIG. 15 wherein a tumbler is gripped and a release position shown broken lines and identified by reference numeral 124A. A stationary gripper assembly 135 is attached to swing arm 120 by a mounting block 136 used to support a mounting rod 137 to which there is attached by a clamp assembly 138 a mounting shaft 139 calling a L-shaped arrangement of grippers rollers 140 and 141. Each of the gripper rollers has an elastomer sleeve at the touch sights for minimizing impact with the tumbler incident to the operation of the grippers 124 and 135. Arm 120 is formed with a drilled opening 142 which can be aligned with a taped hole in 43 to receive a fastener 143 forming a ridged interconnection between arm 120 and pivot arm 43. When this fastener is in place fastener 181 is removed so that the manipulation of the tumbler occurs by pivotal movement about access P of shaft 37. Alternatively fastener 143 is removed and fastener 81 is secured in place to achieve the compounded type swinging movement of arm 20 on pivot arm 43 at the same time arm 43 pivots about access P.

Figure 16:
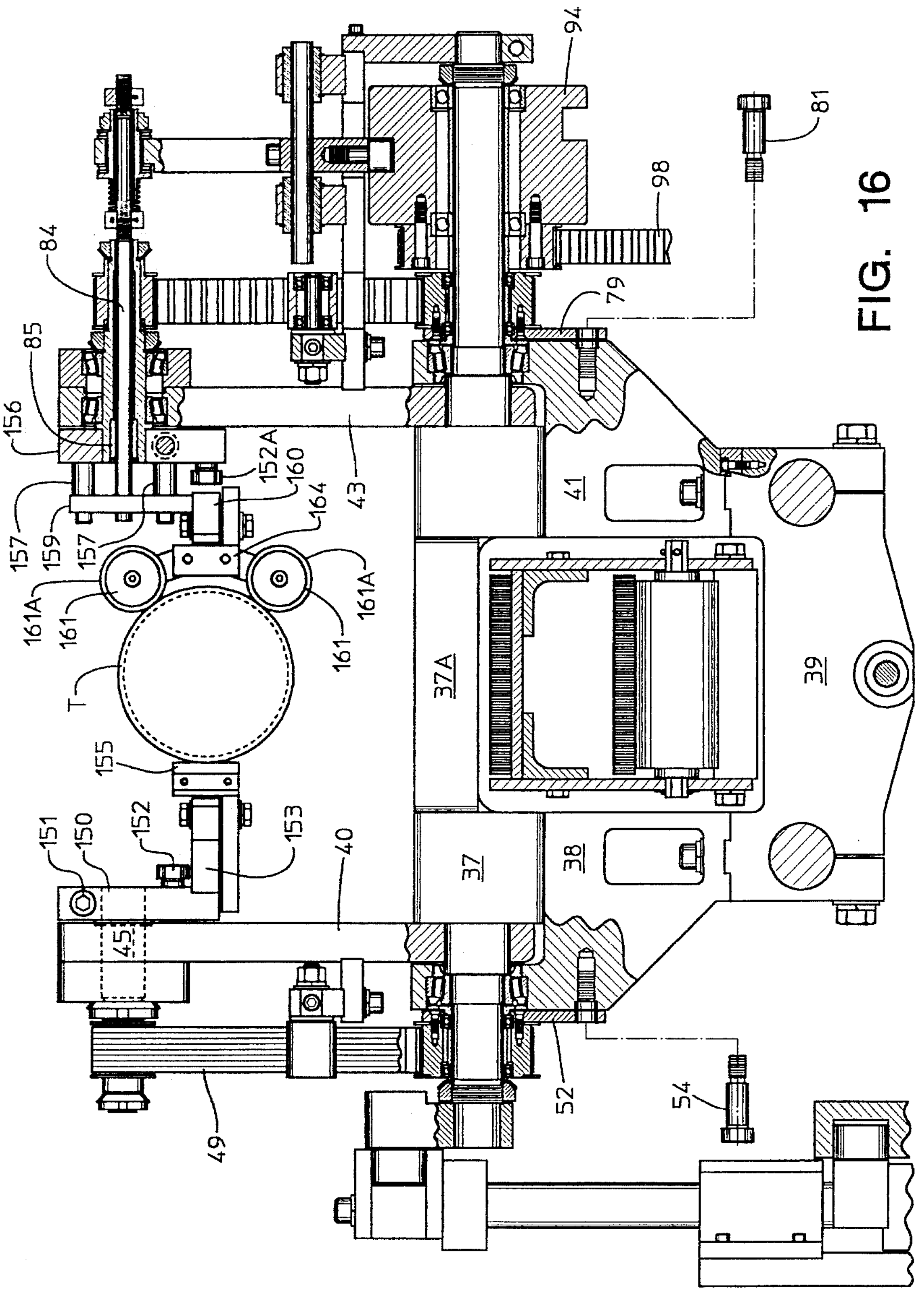
FIG. 16 is a view similar to FIGS. 9 and 15 and illustrating a second alternative embodiment of the present invention.
Figure 17:
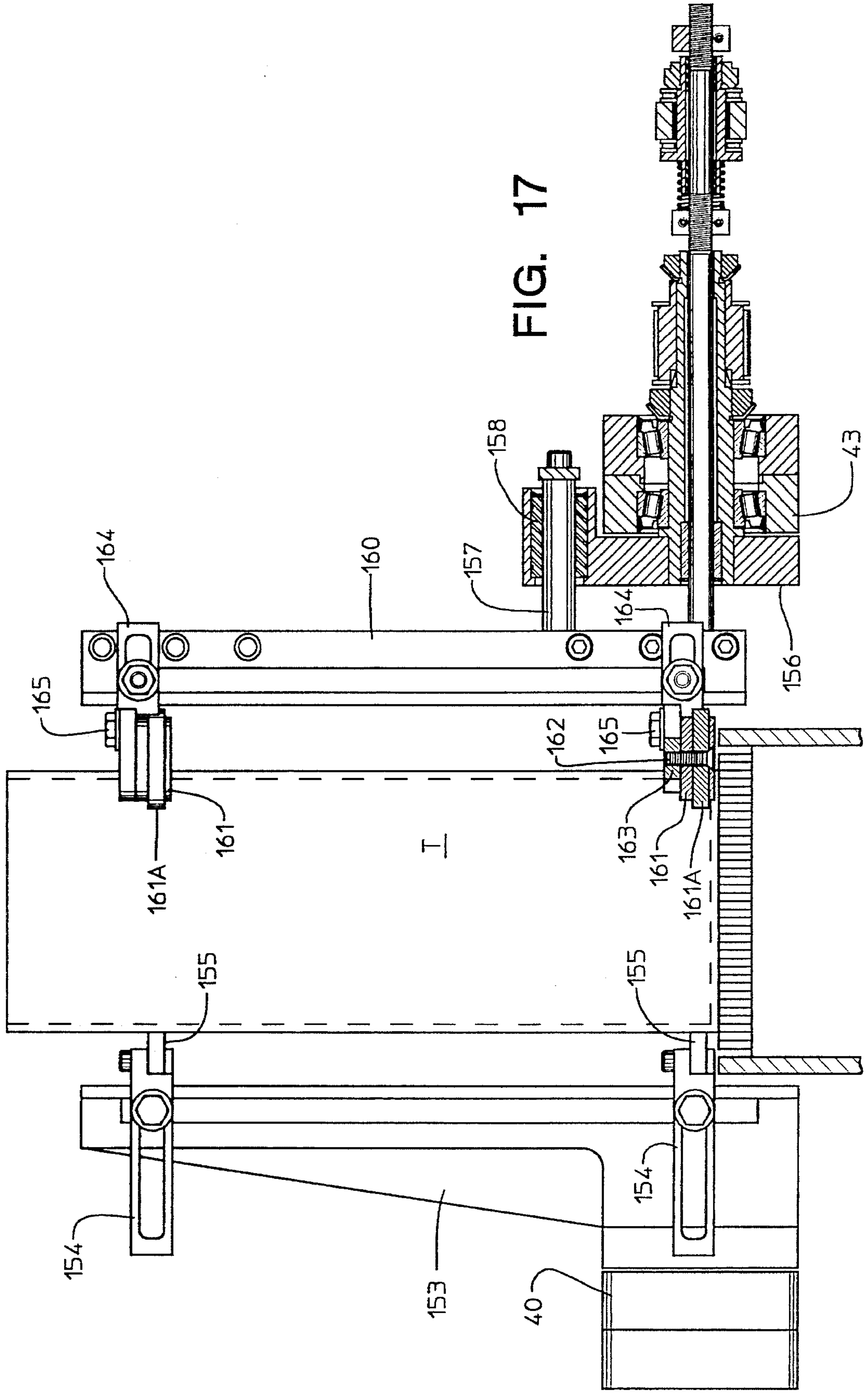
FIG. 17 is a view of the apparatus shown in FIG. 16 after a workpiece has been removed from a vacuum chuck, reorientated and deposited on a delivery conveyor.

FIG. 16 and 17 illustrates further an embodiment of further invention which is characterized by the provision for the moveable gripper to under go linear displacement relative to the tumbler whereas in previous embodiment the moveable gripper was pivoted. The embodiment of FIGS. 16 and 17 includes a swing arm 150 that is clamped onto shaft 45 through operation of a clamp fastener 151. Swing arm 150 provided with a drill hole that can be aligned with a tapped hole in arm 40 to selectively receive a threaded fastener 152. Swing arm 150 supports a carrier arm 153 that in turns adjustably positions and supports spaced apart carriers 154 each having a mounting block for supporting a elastomer pad 155 for engaging surface of tumbler T. The portion of the tubular shaft 73 protruding beyond pivot arm 43 engages with a swing arm 156 which can be locked against relative pivotal movement by a threaded fastener 152A in the same manner as fastener 152 interlocks swing arm 150 with arm 140. Swing arm 156 carries spaced apart guide rods 157 that are slideably supported by linear bearings 158 (FIG. 17) to restrain a carrier plate 159 to linear movement that is parallel with displacement of rod 84 in response to the operation of cam roller 94. For this purpose the end of rod 84 extending beyond linear bearing 85 is secured to the carrier plate 159. Also secured to this carrier plate is an elongated carrier arm 160 serving to support at space apart locations pairs of clamp discs 161. Between each pair of discs there is a tires 161A made of elastomer material for minimizing impact with the tumbler T when brought into the supporting engagement. The discs are attached by a fastener 162 to support arms 163 which in turn are attached a bracket 164 by fasteners 165, the later being used to selective position the discs for contact with the tumbler.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

We claim:

1. An apparatus to selectively orientate workpieces undergoing manipulation, the apparatus including the combination of:

means for delivering a workpiece in a plane at a first orientation to a workpiece receiving site;

gripper means including at least one displacable gripper for supporting a workpiece at the workpiece receiving site;

pivot means including a pivot shaft coupled to at least one pivot arm for pivoting said gripper means between the workpiece receiving site and a workpiece transfer site;

gripper positioning means supported by said pivot arm for interconnecting said gripper means with said pivot arm;

means selectively operable for pivoting said gripper means at a predetermined fixed relation with said pivot arm while said pivot arm and said gripper means pivot between said workpiece receiving site and said workpiece transfer site for establishing one selective orientation of the workpiece;

means selectively operable for rotatably positioning said gripper means relative to said pivot arm while said pivot arm and said gripper means pivot between said workpiece receiving site and said workpiece transfer site for establishing a second selective orientation of the workpiece;

means for moving the displacable gripper into a workpiece gripping position at the workpiece receiving site and for moving the displacable gripper into a workpiece release position at the workpiece transfer site;

means for conveying the workpiece in a second orientation at the workpiece transfer site in a plane along a path of travel; and means to position said pivot means to a preselected position between and relative to each of said means for delivering and said means for conveying by moving said pivot means toward or away from said means for delivering, said pivot means being moved to position said gripper relative to the workpiece on said means for delivering to compensate for varying length workpieces and for selectively establishing said workpiece receiving site, said pivot means being positioned to prevent damaging impact of the work piece with said means for conveying and means for delivering and without changing the distance between the plane of said means for delivering and the plane of said means for conveying.

2. The apparatus according to claim 1 wherein said means for pivoting said gripper means include platform means coupled to said pivot shaft for supporting said gripper means; and means to pivot said pivot shaft about a pivot axis for displacing said gripper means between a position for receiving a workpiece by said gripper means and a position for placing a workpiece in a workpiece release position.

3. The apparatus according to claim 2 wherein said means for pivoting said pivot shaft includes reciprocal rods coupled by a cross head for displacement by a cam follower engaged in a cam track, said cam track being defined in a cam plate driven in a synchronous relation with said means for moving the displacable gripper.

4. The apparatus according to claim 3 wherein said reciprocal rods are coupled to said pivot shaft by a linear guide track joined by a roller at one end of a crank arm coupled to said pivot shaft.

5. The apparatus according to claim 4 wherein said means for pivoting said gripper means further include a swing arm pivotally supported by said pivot arm, and means for releaseably securing said swing arm to said pivot arm for preventing relative motion there between.

6. The apparatus according to claim 1 wherein said means for pivoting said gripper means further include a swing arm pivotally supported by said pivot arm, and means for releaseably securing said swing arm to said pivot arm for preventing relative motion there between.

7. The apparatus according to claim 1 wherein said means for rotatably position said gripper means include a swing arm pivotally support by said pivot arm, means for pivoting said swing arm relative to said pivot arm when said pivot arm pivots said gripper means between the work piece receiving site and the work piece transfer site.

8. The apparatus according to claim 7 wherein said means for pivoting said swing arm include an arbor secured to said swing arm and rotative supported by said pivot arm, and means for rotating said arbor relative to said pivot shaft.

9. The apparatus according to claim 8 wherein said means for rotating said arbor include a drive pulley for rotating said arbor, and means including a control arm coupled by a belt to said drive pulley.

10. The apparatus according to claim 9 wherein said means including a control arm further include a idler pulley supported by said pivot, means for securing said control arm to said idler pulley, and means for releasing securing said control arm to establish relative pivot movement between said idler pulley and said pivot.

11. The apparatus according to claim 1 wherein said pivot arm supports said displacable gripper for movement toward and away from a fixed gripper.

12. The apparatus according to claim 1 further including guide rods received by linear bearings supported by said pivot arm to move said displaceable gripper toward and away from a fixed gripper.

13. The apparatus according to claim 12 wherein said means for rotatably positioning include a swing arm secured to said linear bearings and pivotally supported by said pivot arm.

14. The apparatus according to claim 13 wherein said gripper means includes pairs of cradle rollers supported by said swing arm at spaced apart locations.

* * * * *